UNITED STATES PATENT OFFICE.

ANDREW J. WEEKS AND JOHN E. WEEKS, OF LITTLETON, NEW HAMPSHIRE.

PROCESS OF TANNING.

SPECIFICATION forming part of Letters Patent No. 289,588, dated December 4, 1883.

Application filed September 11, 1883. (No specimens.)

*To all whom it may concern:*

Be it known that we, ANDREW J. WEEKS and JOHN E. WEEKS, of Littleton, in the county of Grafton, State of New Hampshire, have invented a certain new and useful Improvement in Processes of Tanning, of which the following is a description sufficiently full, clear, and exact to enable any person skilled in the art or science to which said invention appertains to make and use the same.

Our invention relates more especially to tanning deer, sheep, calf, goat, and dog skins, or to the class of skins usually employed in the manufacture of gloves and mittens; and it consists in the employment of a novel combination of ingredients in the tanning-liquors, in connection with a proper manipulation of the stock, all as hereinafter more fully set forth and claimed, by which better results are attained than by the ordinary process.

The nature and operation of the improvement will be readily understood by all conversant with such matters from the following explanation, its extreme simplicity rendering an elaborate description unnecessary.

In carrying out the process we first prepare what we denominate "liquor No. 1." This liquor is composed of one hundred pounds of gambier, twelve pounds of alum, three pounds of carbonate of soda, one pound of common bar-soap, and sixteen gallons of water. These ingredients are all placed in a barrel, heated by steam, and are stirred until thoroughly dissolved and mixed. Into this liquor we place one hundred skins of the average size, and allow them to remain for six days, the strength of the liquor being increased each day from five to twenty degrees by the barkometer. The skins are then removed and scoured on the flesh side in the ordinary manner, after which they are submitted to a second tanning process in a liquor which we denominate "liquor No. 2." This liquor is composed of one hundred pounds of alum, ten pounds of nitrate of potash, five pounds of bicarbonate of soda, and two ounces of tannic acid. These ingredients are thoroughly mixed in a dry state, and then added to a sufficient quantity of water to form a liquor for the one hundred skins, the quantity of the water being increased or decreased, as the case may be, to make the liquor of 10° strength by the barkometer, after which the skins are put into the liquor, which is heated to 120° Fahrenheit, where they are allowed to remain for six hours, after which they are taken out and again scoured on the flesh side and dried. After they are properly dried they are submitted to the action of another liquor, which we denominate "liquor No. 3." This liquor is composed of six pounds of alum, two pounds of sulphate of magnesia, and one-half a pound of nitrate of potash, dissolved in thirty-two gallons of water heated to a temperature of 140° Fahrenheit. In using liquor No. 3 it is placed in a stuffing-wheel, which has been previously heated by steam, the skins being also placed in the wheel and the wheel operated in the usual manner for half an hour, after which they are removed and again scoured on the flesh side and oiled with pure neat's-foot oil.

The proportions of the various ingredients may be changed somewhat and others of like nature substituted without entirely departing from the spirit of our invention, which having thus explained,

What we claim is—

The process of tanning hides or skins, the same consisting, essentially, in treating them first with a liquor composed of water, gambier, alum, carbonate of soda, and soap; second, with a liquor composed of water, alum, nitrate of potash, bicarbonate of soda, and tannic acid; and, third, with a liquor composed of water, alum, sulphate of magnesia, and nitrate of potash, in about the proportions and substantially as herein described.

ANDREW J. WEEKS.
JOHN E. WEEKS.

Witnesses:
- W. H. MITCHELL,
- L. J. WHITE.